Nov. 8, 1932.  H. L. TURNEY  1,887,444
LOGGING ENGINE
Filed Oct. 20, 1928  2 Sheets-Sheet 1
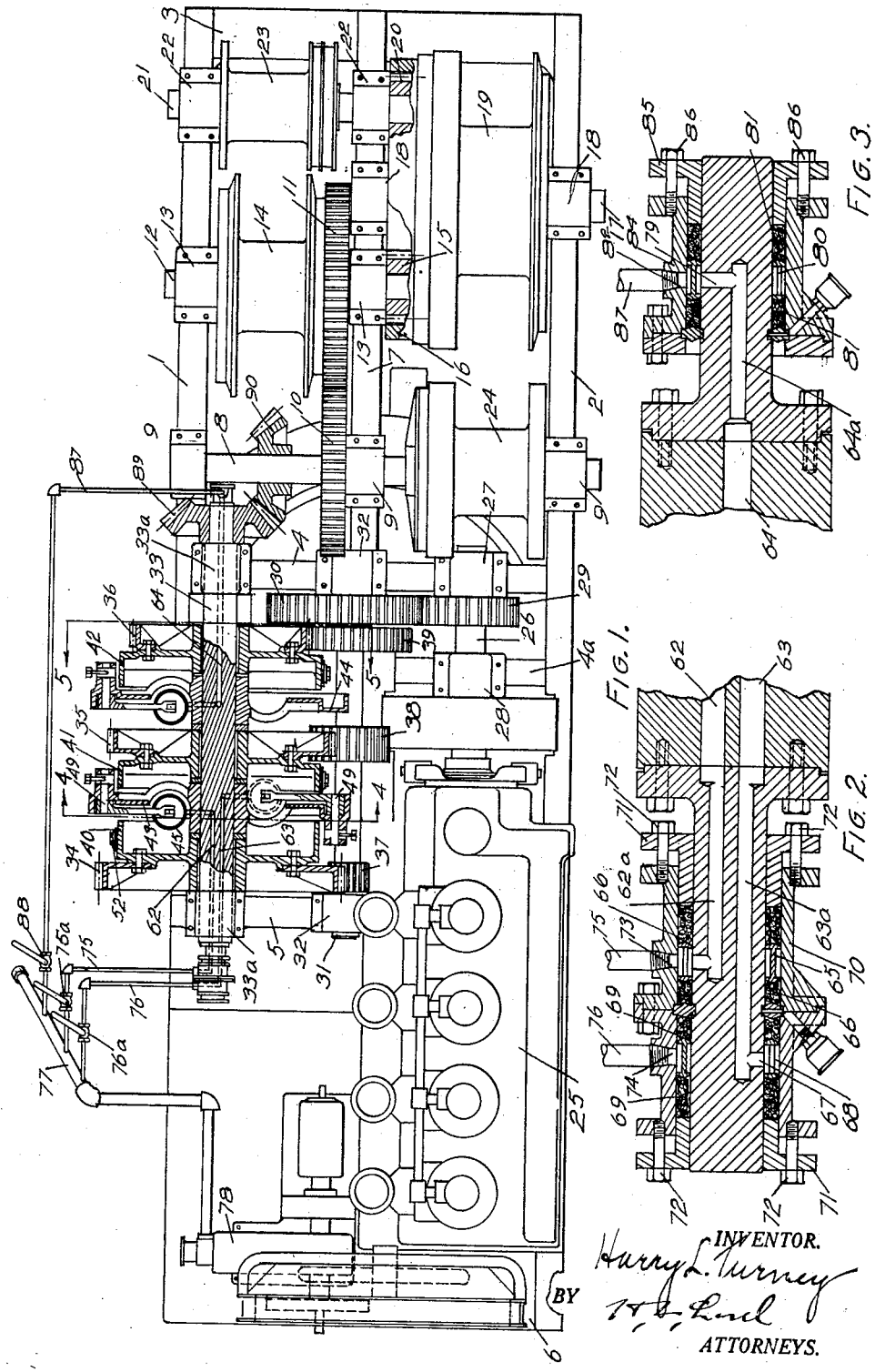
INVENTOR.
Harry L. Turney
BY
ATTORNEYS.

Nov. 8, 1932.    H. L. TURNEY    1,887,444
LOGGING ENGINE
Filed Oct. 20, 1928    2 Sheets-Sheet 2

Harry L. Turney
INVENTOR.

BY
ATTORNEYS.

Patented Nov. 8, 1932

1,887,444

UNITED STATES PATENT OFFICE

HARRY LEON TURNEY, OF PORTLAND, OREGON, ASSIGNOR TO PATENTS & ROYALTIES CORPORATION, A CORPORATION OF CALIFORNIA

LOGGING ENGINE

Application filed October 20, 1928. Serial No. 313,731.

The invention is particularly designed to improve the driving means of a logging engine, particularly to so arrange it that internal combustion engines preferably of the Diesel type may be used for the power requirements. Logging engines are, from the nature of their use, somewhat limited in their dimensions and the present invention is designed to form a compact yet rigid machine of this type. In utilizing an internal combustion engine it is desirable to maintain a comparatively constant speed and to provide for speed changes in the action of the logging engine drums through speed changing devices between the engine and the drums. Such speed changing devices must be capable of very rapid change in order that the speed may be stepped up without losing the inertia effects of the already moving load at the slower speeds, in other words, the mechanism must be capable of stepping up from one speed to another without losing the head way of the load. Features and details of the invention will appear from the specification and claims.

A preferred embodiment of the invention is illustrated in the accompanying drawings as follows:—

Figure 4:
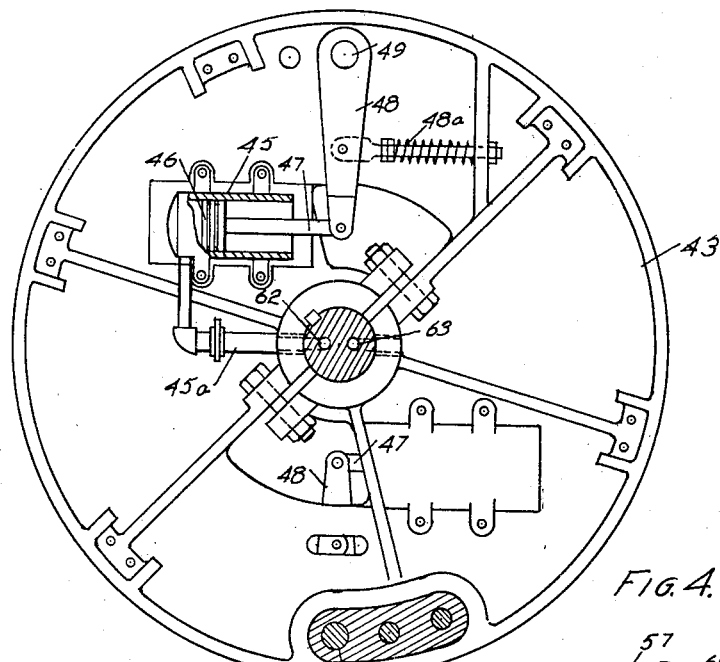
Figures 5, 6:
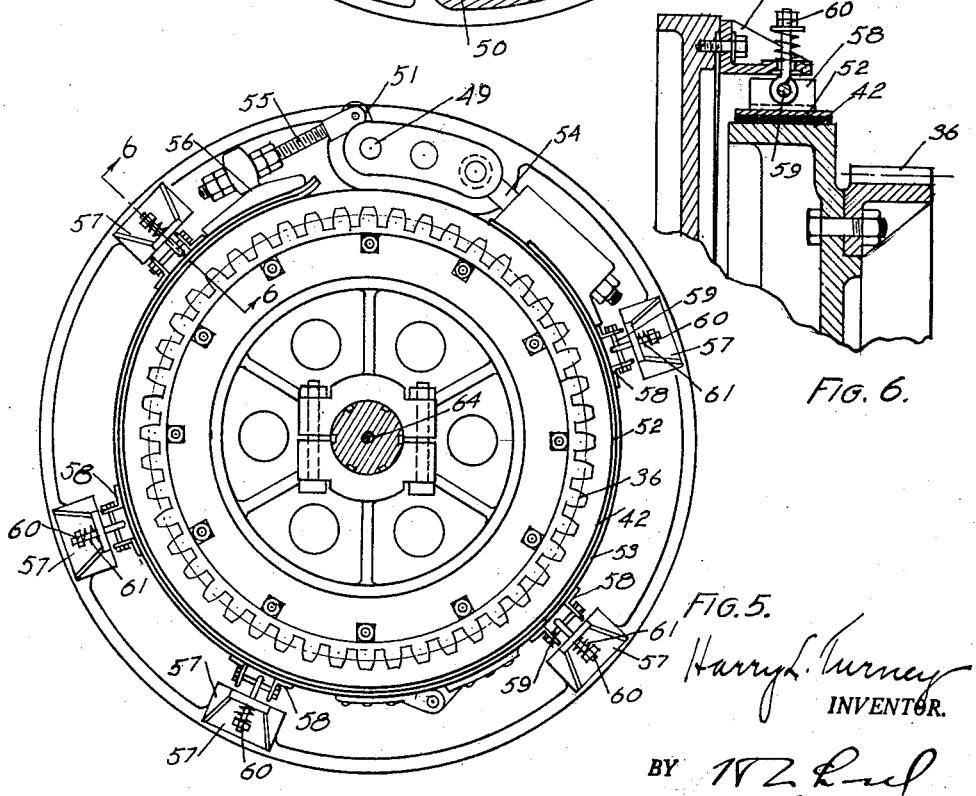

Fig. 1 shows a plan view of the device.
Fig. 2 one of the nozzles for delivering air to the clutches.
Fig. 3 a second of the nozzles delivering air to the clutches.
Fig. 4 a section on the line 4—4 in Fig. 1.
Fig. 5 a section on the line 5—5 in Fig. 1.
Fig. 6 a section on the line 6—6 in Fig. 5.

The frame is made up of the side sills 1 and 2, the cross members 3, 4, 5 and 6, a central member 7 and a partial cross member 4a. The drum system of the engine is driven from a shaft 8. The shaft 8 is carried in bearings 9 on the lengthwise members of the machine. A gear 10 is fixed on the shaft 8 and meshes with a gear 11. The gear 11 is carried by a shaft 12. The shaft 12 is journaled in bearings 13 and carries the pull-back drum 14. A gear 15 is fixed on the inner end of the shaft 12 and meshes with an internal gear 16. The internal gear is fixed on a shaft 17 carried in bearings 18. A main drum 19 is arranged on the shaft 17. A gear 20 meshes with the internal gear 16. It is fixed on a shaft 21. The shaft 21 is mounted in bearings 22 and carries a drum 23. Another drum 24 may be conveniently arranged on the shaft 8. These drums are all adapted to be locked into driving relation with the gear system described in the usual manner by controlling means (not shown) secured to the ends of the shafts 8, 12, 17 and 21.

A Diesel engine 25 is mounted on the frame, this engine being provided with a plurality of cylinders and extending lengthwise of the frame and preferably along one side thereof. A shaft 26 driven from the engine is mounted in bearings 27 and 28 and a gear 29 is fixed on the shaft 26.

The gear 29 meshes with a gear 30. The gear 30 is fixed on a shaft 31 forming a part of a speed changing device. The shaft 31 is mounted in bearings 32—32. A shaft 33 is mounted in bearings 33a on the frame. A series of gears 34, 35 and 36 are journaled on the shaft 33 and these gears mesh with gears 37, 38 and 39 respectively. Friction discs 40, 41 and 42 are secured to and carried by the gears 34, 35 and 36 respectively. A band carrier 43 is arranged between the discs 40 and 41 and a band carrier 44 at the side of the disc 42. These band carriers are fixed on the shaft 33.

Each of the band carriers are supplied with a similar mechanism as follows: A cylinder 45 is mounted on the carrier. A piston 46 operates in the cylinder and a thrust rod 47 extends from the piston to a rock lever 48. The rock lever is mounted on a rock shaft 49. It is normally returned by a spring 48a, the return movement effecting the release of the clutch as hereinafter described. The rock shaft 49 is mounted in a bearing 50 in the carrier and a rock arm 51 is arranged on the opposite end of the shaft. A friction band 52 surrounds the friction discs and engages a cylindrical surface on the outer periphery of the disc. This friction band is anchored on a band 53 secured in the carrier by means of a bolt 54. The free end of the band is secured by a bolt 55 secured to the rock arm 51 and to a bracket 56 on the band. It will readily be seen that as the piston is operated, the rock arm 48 swung, the rock arm 51 is likewise swung and this draws the band into frictional engagement with the friction disc. Brackets 57 are secured on the carrier. Ears 58 are arranged on the band. A pin 59 extends between the ears 58 and an eye bolt 60 extends from the pin 59 through the bracket 57. A spring 61 operates on the eye bolt to yieldingly draw the band from the friction disc. The outer edges of the ears 58 form steps limiting the outward movement of the band and thus control the amount of clearance between the band and the friction disc when in released position. Each of the cylinders is connected by a pipe 45a with an opening in the shaft for controlling operating fluid to these clutches, the opening 62 leading from the low speed clutch, the opening 63 from the intermediate speed clutch and the opening 64 from the high speed clutch. The openings 62 and 63 lead to passages 62a and 63a in a nozzle secured at one end of the shaft 33. The passage 62a terminates in a radial opening through the shaft which is connected to an annular passage around the shaft formed by a spacer 65. Gaskets 66 are arranged at each side of the spacer. The opening 63a leads through a radial opening 67 to an annular space controlled by an annular spacer 68 and gaskets 69 are arranged at each side of the spacer 68. A sleeve 70 is arranged around the spacers and gaskets and followers 71 are arranged at each end of the sleeve and are drawn up by bolts 72 so as to properly seat the gaskets. Openings 73 and 74 lead through the sleeve 70 from the annular spaces 65 and 68 and pipes 75 and 76 lead from the openings 73 and 74 respectively and these pipes are controlled by valves 75a and 76a respectively. The pipes 75 and 76 are connected to a main supply pipe 77 leading from a compressor 78 driven by the engine 25. A similar nozzle is arranged at the opposite end of the shaft and comprises a passage 64a connecting with the opening 64 in the shaft. It has a radial opening 79 leading to an annular space formed by a spacer 80. Gaskets 81 are arranged each side of the spacer. Openings 82 are arranged in a sleeve 84. Followers 85 are arranged in the ends of the sleeve and these are drawn up by the bolts 86. A pipe 87 leads from the opening 82 to the supply pipe 77 and this pipe is controlled by a valve 88.

While I have shown but three clutches indicating three speeds for the different drums, it will be understood that a plurality of air-controlled openings may be used in either end of the shaft and the number of gears and speed changes arranged as desired. While I have shown separate controls by separate valves for each of the clutches it will readily be understood that these may be gathered up into a single valve actuating mechanism for this purpose.

A beveled gear 89 is arranged on the end of the shaft 33 and meshes with a beveled gear 90 on the shaft 8 so that the power to the engine is transmitted through the speed changing device and the beveled gears to the drum driving the shaft 8 and from the drum driving the shaft 8 to the several drums by the mechanisms hereinbefore described.

One of the principal advantages of this arrangement is that it may be substituted for logging engines now in the field utilizing the ordinary steam engine and boiler for power. By this arrangement of Diesel engine and speed changing device the boiler and engine may be removed and the frame supply sufficient space and rigidity for connecting up the power mechanisms as illustrated.

By utilizing both ends of the shaft 33 a greater number of clutches may be readily controlled. While I have shown two controls extending through one end of the shaft and a single control through the opposite end of the shaft I do not wish to be limited to this number.

What I claim as new is:—

1. In a logging engine, the combination of a frame of greater length than width; drums mounted crosswise of the frame; a speed changing mechanism comprising a shaft extending lengthwise of the frame; a motor mounted with its driving shaft lengthwise of the frame the motor and speed changing device being within the frame and alongside each other; an intermediate shaft between the motor and the speed changing shaft driven from the motor and communicating the movement to the speed changing shaft, said shafts being overlapping; a gear connection between the intermediate shaft and the speed changing shaft of different ratios; means for throwing in and out the driving connections through the different gears to change the speed; and a driving connection between the speed changing mechanism and the drums.

2. In a logging engine, the combination of a frame of greater length than width; drums mounted crosswise of the frame; a speed changing mechanism comprising a shaft extending lengthwise of the frame a motor having its shaft lengthwise of the frame, said motor and speed changing device being within the frame and alongside each other; a plurality of gears carried by the shaft; carriers mounted on the shaft; friction clutches between the carriers and gears; a fluid-actuated clutch operating means comprising fluid connections leading to the end of the shaft; and a driving connection between the speed changing mechanism and the drums.

3. In a logging engine, the combination of a frame of greater length than width; drums mounted crosswise of the frame; a drum driving shaft mounted crosswise of the frame; a speed changing mechanism comprising a shaft, extending lengthwise of the frame a motor having its shaft lengthwise of the frame, and the motor and speed changing device being within the frame and overlapping each other; a beveled gear connection between said speed changing shaft and drum driving shaft; and a driving connection between the motor and the speed changing mechanism.

In testimony whereof I have hereunto set my hand.

HARRY LEON TURNEY.